United States Patent Office 2,806,389
Patented Sept. 17, 1957

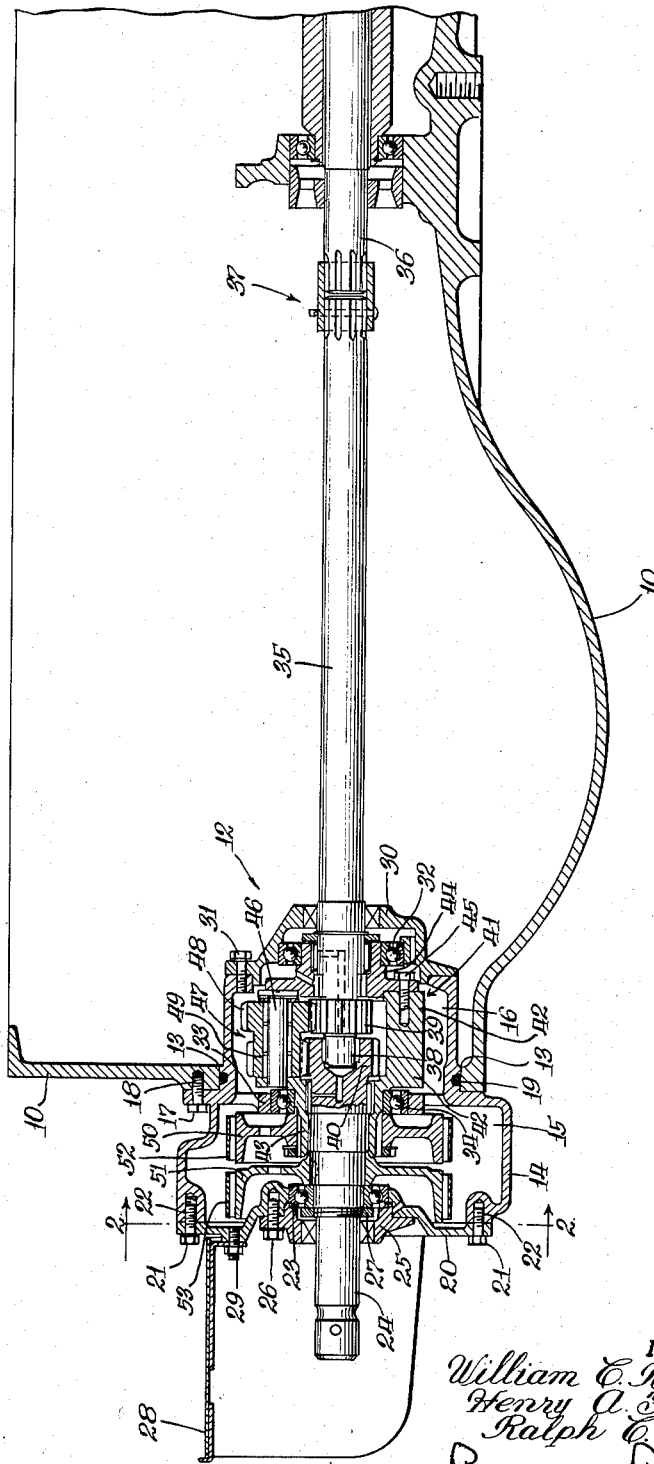

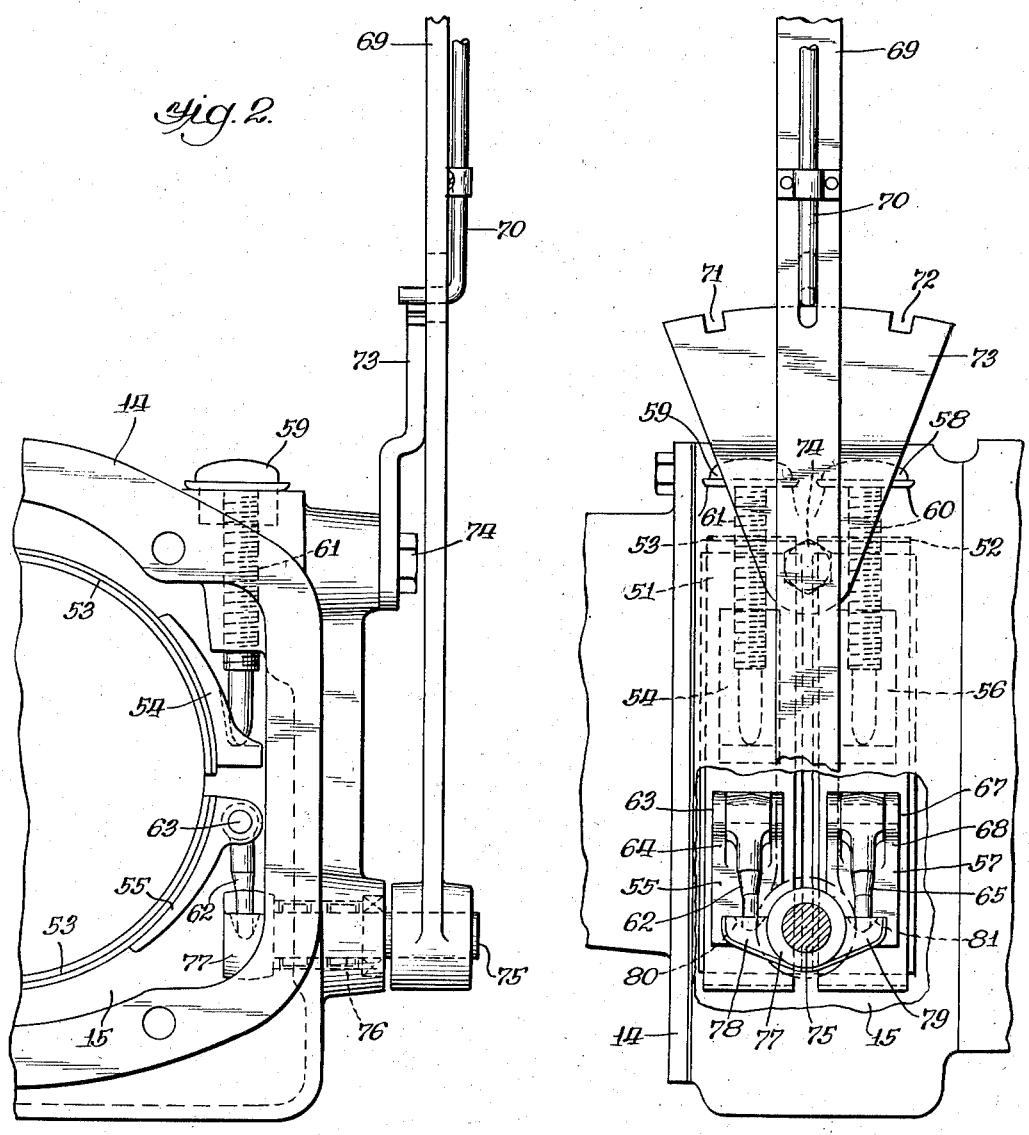

2,806,389

POWER TAKE-OFF MECHANISM FOR TRACTORS

William C. Rosenthal, Chicago, Henry A. Ferguson, Lombard, and Ralph C. Boyle, Chicago, Ill., assignors to International Harvester Company, a corporation of New Jersey Application June 4, 1954, Serial No. 434,453

1 Claim. (Cl. 74—789)

This invention has to do with an auxiliary power take-off mechanism for a vehicle such as, for example, tractors and the like and more in particular concerns a detachable power take-off unit having speed-reducing characteristics in combination with a braking means for selectively driving the power take-off driven shaft at reduced speed or preventing rotation of the driven shaft by braking.

Tractors generally have a power take-off shaft through which rotative power is transmitted from a source of power on the tractor for driving movable parts of an implement, such as mowing machines or the like, while the implement is being pulled or otherwise propelled by the tractor. Some of these power take-off units are adapted to derive power from the tractor's engine at some point ahead of the tractor's main clutch. This type is generally referred to as an "independent power take-off" because its operation is entirely independent of the main clutch and tractive transmission unit.

In some types of implements having movable parts driven by the tractor's power take-off mechanism it is desirable to have the power take-off output shaft operate at a reduced speed providing increased torque to the movable parts of the implement. In addition, from the standpoint of safety to the operator and possible damage to the implement, it is desirable that the power take-off be not only disengageable from its driving source but also braked against rotation when either not in use such as during transport or when connecting or disconnecting an implement to the tractor.

Accordingly the present invention contemplates and has as an object thereof the provision of a reduced speed planetary gearing power transmission unit drivingly connected to the tractor's engine, independent of the tractor's tractive propelling means, that may be engaged or disengaged under load at a reduced speed.

A further object is the provision of a power take-off mechanism having its driven shaft brakable against rotation when the planetary gearing power transmission unit is disengaged thereby permitting the drive shaft of the mechanism to continue rotation while the driven shaft is braked against rotation.

Another object is the provision of a power take-off mechanism in accordance with the preceding objects whereby the mechanism is auxiliary in that it is detachable for replacement by a conventional power take-off unit.

A still further object is to provide a power take-off mechanism in accordance with the preceding objects whereby the control of the mechanism is adapted for operation by the tractor operator from the operator's station.

These and further desirable objects inherent in and encompassed by the invention are further evident in the ensuing description, the appended claims and the annexed drawings, wherein:

Figure 1 is a side elevational view, in section, taken through the longitudinal axis of the power take-off mechanism mounted on the rearward portion of a tractor.

Figure 2 is an end elevational view taken along the line 2—2 of Figure 1 broken to illustrate details of the braking mechanism and omitting the rotatable parts and the bearings therefor.

Figure 3 is a side elevational view partly broken away to illustrate the means for controlling the operation of the braking means.

Referring to Figure 1 casing 10 is part of the rearward end of a tractor frame and encloses the usual conventional change-speed tractive transmission system (not shown) for providing power from the engine to the traction means, such as wheels of a tractor. The power take-off mechanism generally indicated at 12 is mounted in an opening 13 on the rearward portion of the casing 10.

The power take-off mechanism 12 comprises a compartmented housing 14 mounted in the opening 13 forming a brake-containing chamber 15 and a planetary gearing unit containing compartment 16. The housing 14 is positioned in the opening 13 of the casing 10 by suitably disposed bolts, one of which is illustrated at 17, threaded for reception into corresponding threaded bores, one of which is shown at 18, in the casing 10. A circumferentially disposed sealing ring 19 is interposed at the juncture of casing 10 and housing 14 to prevent the leakage of lubricant from the casing 10 therethrough.

On the rearward end of the housing 14 is mounted an end bell 20 secured by suitably disposed bolts, two of which are shown at 21, fitted for reception into corresponding threaded bores 22 of the housing 14. The bell 20 supports a bearing 23 rotatably carrying the power take-off mechanism's driven shaft 24. The bearing 23 is positioned by a retaining member 25 secured to bell 20 by suitably disposed bolts, one of which is illustrated at 26. A collar 27 connected to the driven shaft 24 is positioned between the bearing 23 and retaining member 25 to prevent endwise or axial movement of the driven shaft 24 with respect to the mechanism 12.

A safety shield 28 is mounted on the end bell 20 and secured thereto by a stud and nut assembly 29. This shield 28 is intended to prevent an operator from injury by reason of contact with the driven shaft 24 during operation thereof.

On the inner end portion of the housing 14 extending into the casing 10 is a cap member 30 secured to the housing 14 by suitably disposed bolts one of which is illustrated at 31. The cap 30 supports a bearing 32. A web portion or wall 33 of the housing 14 separates the chamber 15 from the compartment 16 and supports a bearing 34. A drive shaft 35 is drivingly connected to a source of power or power train shaft 36 through a conventional splined coupling generally indicated at 37. The other end of the drive shaft 35 extends into the compartment 16 where it is piloted at 38 into the other end of the driven shaft 24 in coaxial alignment therewith. A driving element or first sun gear 39 is constrained for rotation with the drive shaft 35. On the other end of the driven shaft 24 and constrained for rotation therewith is a driven element or second sun gear 40. A force-reaction member generally indicated at 41 comprises a planetary carrier 42 rigidly connected to one end of a tubular shaft 43 constrained for rotation concentrically about the axis of the driven shaft 24 and supported for rotation by the bearing 34. The carrier 42 is rigidly connected to a bearing member 44 by suitably disposed bolts, one of which is shown at 45. The member 44 is supported rotatably on bearing 32. On the carrier 42 of the force-reaction member 41 there is provided a plurality of pinion shafts, one of which is shown at 46, disposed equilaterally about the carrier 42 the axes thereof being parallel to the axis of the drive shaft 35, Each of the pinion shafts 46 are supported at both ends by the carrier 42. On each of the pinion shafts 46 there is a gear element, generally indicated at 47, constrained for rotation about the axis of the respective pinion shaft such as shown at 46. Each gear element 47 is comprised of a first pinion gear 48 integrally connected to and constrained for rotation about its respective pinion shaft with a second pinion gear 49. The first pinion gear 48 of each gear element 47 is adapted to mesh or engage with the first sun gear 39 while the second pinion gear 49 of each gear element 47 is adapted to mesh or engage with the second sun gear 40. From this it can be seen that if the carrier 42 and tubular shaft 43 of the force-reaction member 41 is constrained against rotation about the axis of the drive shaft 35 and the driven shaft 24, there is established a driving connection from the drive shaft to the first sun gear 39, to the first and second pinion gears 48 and 49, thence to the second sun gear 40 and driven shaft 24.

In the brake containing chamber 15 there is provided a first brake means including a first annular friction element or first brake drum 50 and a second brake means including a second annular friction element or second brake drum 51.

The first brake drum 50 is mounted on and constrained for rotation with the tubular shaft 43 of the force-reaction member 41. The outer periphery of the first brake drum 50 is surfaced in a conventional manner so that it is adapted to frictionally engage a first brake shoe 52. Thus the frictional engagement of the first brake shoe 52 with the first brake drum 50 prevents rotation of the drum 50 and the force-reaction member 41 thereby engaging the planetary gearing unit 12 for causing the transmission of power from the drive shaft 35 to the driven shaft 24.

The second brake drum 51 is mounted on and constrained for rotation with the driven shaft 24. The outer periphery of the second brake drum 51 is surfaced in a conventional manner so that it is adapted to frictionally engage a second brake shoe 53. Thus the frictional engagement of the second brake shoe 53 with the second brake drum 51 prevents rotation of the drum 51 and the driven shaft 24.

From the above it is readily apparent that only one of the two brake means may be engaged at any given time for satisfactory operation of the power take-off mechanism. Accordingly we now proceed to discuss the brake engaging means and control therefor for alternately engaging one of said brake means while simultaneously disengaging the other brake means.

Referring now to Figures 2 and 3 the second brake shoe 53 is fitted with upper and lower lug members 54 and 55 fixed rigidly thereto and adapted to cause frictional engagement of the second brake shoe 53 with the second brake drum 51 when the member 55 is moved in an upward direction toward the upper lug 54 in a conventional manner. Similarly the first brake shoe 52 is fitted with upper and lower lug members 56 and 57 fixed rigidly thereto and adapted to cause frictional engagement of the first brake shoe 52 with the first brake drum 50 when the member 57 is moved in an upward direction toward the upper lug 56.

It can be appreciated that any frictional type braking mechanism is subjected to considerable wear on the braking surfaces and, therefore, some means of take-up adjustment is advisable. For this purpose there is provided two adjustment screws 58 and 59. For the first brake shoe 52 the adjustment screw 58 is fitted into a threaded bore 60 in housing 14 and adapted to engage the upper lug member 56 for vertical take-up movement on the brake shoe 52. Similarly for the second brake shoe 53 the adjustment screw 59 is fitted into a threaded bore 61 in housing 14 and adapted to engage the upper lug member 54 for vertical takeup movement on the brake shoe 53.

On the lower lug member 55 of the second brake shoe 53 there is provided a downwardly depending pin 62 pivotally mounted at 63 on a bifurcated bearing support 64. The support 64 is integrally connected to the lower lug member 55 of the second brake shoe 62. Similarly on the lower lug member 57 of the first brake shoe 52 there is provided a downwardly depending pin 65 pivotally mounted at 67 on a bifurcated bearing support 68. The support 68 is integrally connected to the lower lug member 57 of the first brake shoe 52.

In order to control the engagement or disengagement of the first and second brake means there is provided a manually operable control lever 69 (partly shown) having a detent latch 70 adapted to engage alternately slots 71 and 72 of a quadrant 73. The quadrant 73 is mounted rigidly on the housing 14 by bolt 74 adapted to fit into a threaded bore (not shown) in the housing 14. The control lever 69 is rigidly connected to a control shaft 75 at the outer portion thereof. The control shaft 75 is fitted for rotational movement in a laterally disposed bore 76 through the lower portion of the housing 14 with its axis positioned midway between the first and second brake shoes 52 and 53. The control shaft 75 extends through the bore 76 into the chamber 15 of the housing 14. On the inner end portion of the control shaft 75 is mounted a control member 77 having oppositely disposed arms 78 and 79 thereon. The arm 78 has a cup-shaped recessed portion 80 on the upper portion thereof positioned to receive and retain the lower end of depending pin 62. Similarly the arm 79 has a cup-shaped recessed portion 81 on the upper portion thereof positioned to receive and retain the lower end of depending pin 65. It should be noted that the recessed portions 80 and 81 are adapted to retain pins 62 and 65, respectively, in position to permit the brake shoes 53 and 52, respectively, in a disengagement relation with respect to brake drums 51 and 50 when the arms 78 and 79 are horizontally disposed. The pins 62 and 65 are urged downwardly to seat in the recessed portions 80 and 81 of the arms 78 and 79 by the spring resiliency of the brake shoes 53 and 52 tending toward disengagement from the brake drums 51 and 50. The control member 77 is constrained for rotational movement with the control shaft 75 attendant to movement of the control lever 69.

*Operation*

Reference is made to Figure 3 where the control lever 69 is shown in a "neutral" position. It should be understood that the lever 69 extends upwardly beyond that shown in the drawing to a point where the operator may shift the position of the lever conveniently from his station on the tractor. In the neutral position shown the arms 78 and 79 are horizontally disposed. In this position both brake shoes 52 and 53 are disengaged from the brake drums 50 and 51 respectively. Thus both drums 50 and 51 are rotatable.

When the control lever 69 is in the neutral position as shown, driving force from the engine of the tractor transmitted to the drive shaft 35 causes driving rotation of the driving element or first sun gear 39. The first sun gear 39 urges rotation of the first pinion gear 48 and its complementary second pinion gear 49 of the gear element 47. The second pinion gear 49 in turn urges rotation of the driven element or second sun gear 40 and its associated driven shaft 24. Assuming that the driven shaft 24 is drivingly connected to movable parts of an implement (not shown) the load on the driven shaft 24 resists any urge to rotate as may be imparted to the second sun gear 40 by the gear element 47. As a consequence thereof the force-reaction member 41 including planetary carrier 42 is caused to drivingly rotate concentrically about the axis of the drive shaft 35. Rotation of the carrier 42 causes rotation of the tubular shaft 43 and the first brake drum 50. Since brake drum 50 is free to rotate the energy transmitted by the drive shaft 35 is dissipated in rotating the drum 50. From this it can be seen that when the lever 69 is in a neutral position there is no driving connection between the drive shaft 35 and the driven shaft 24.

Generally speaking a tractor operator is desirous of either transmitting power from the drive shaft 35 to the driven shaft 24 or locking the driven shaft 24 from further rotation. For this reason we have not shown a detent slot in the quadrant 73 for maintaining the lever 69 in a neutral position.

With reference to Figure 3, if the operator desires to transmit power from the drive shaft 35 to the driven shaft 24 he moves the control lever 69, from the operator's station, rearwardly until the detent latch 70 engages slot 71 of the quadrant 73. This movement causes the control shaft 75 and its associated control member 77 to rotate a few degrees in a counter-clockwise direction. The arms 78 and 79 associated with the control member 77 also move correspondingly about the axis of the control shaft 75 with the control member 77. The arm 78 recedes in a downward direction permitting the pin 62 to move downward which allows further expansion of the associated second brake shoe 53 in a direction opposite to that required for engagement with the second brake drum 51. Thus the second brake drum 51 remains rotatable with its associated driven shaft 24. The movement of arm 79 is in an upward direction driving the pin 65 upwardly in a direction to close or engage the first brake shoe 52 with the first brake drum 50. Thus the first brake drum 50 is locked from further rotation by frictional engagement with the first brake shoe 52 and, referring to Figure 1, the associated force-reaction member 41 including the tubular shaft 43, carrier 47 and member 44 are also locked from rotation about the axis of the drive shaft 35 and driven shaft 24. Driving force from the drive shaft 35 drives the first sun gear 39. The first sun gear 39 drives the gear element 47 rotatably about its pinion shaft 46 through the first pinion gear 48. The second pinion gear 49 is driven by the first pinion gear 48 and is meshed with the second sun gear 40, thereby driving the sun gear 40 and its associated driven shaft 24. Thus driving force from the drive shaft 35 is transmitted at reduced speed to the driven shaft 24. The reduced speed between the drive shaft 35 and the driven shaft 24 is effected by employing a first sun gear 39 of smaller diameter than the second sun gear 40 and similarly employing a first pinion gear 48 larger than the second pinion gear 49 according to well known planetary gearing systems which need not be discussed here.

Referring back to Figure 3 if the operator now desires to terminate the transmission of force from the drive shaft 35 to the driven shaft 24, he releases the detent latch 70 from the slot 71 in the quadrant 73 and moves the lever 69 forwardly until the detent latch 70 engages the slot 72 of the quadrant 73. This movement causes the control lever 69 to pass through the above described neutral position to a position for locking the driven shaft 24 against rotation and disengaging the transmission of driving force from the drive shaft 35 to the driven shaft 24. The movement of the control lever 69 in a forward direction to the position whereby the detent latch 70 engages the slot 72 of the quadrant 73 causes the control shaft 75 and its associated control member 77 to rotate several degrees in a clockwise direction. The arms 78 and 79 associated with the control member 77 also move correspondingly about the axis of the control shaft 75 with the control member 77. The arm 79 recedes in a downward direction permitting the pin 65 to move downward which allows expansion of its associated first brake shoe 52 in a direction for disengagement with the first brake drum 50. Thus the first brake shoe 52 disengages from the first brake drum 50 permitting the first brake drum 50 to rotate. The driving force from the drive shaft 35 is thereby dissipated through the free rotation of the first brake drum 50 similar to that described previously for neutral position of the control lever 69. In this position it can be seen that the driving force from the drive shaft 35 is no longer transmitted to the driven shaft 24. The movement of arm 78 is in an upward direction driving the pin 62 upwardly in a direction to close or engage the second brake shoe 53 with the second brake drum 51. Thus the second brake drum 51 and the driven shaft 24 associated therewith is locked from further rotation by frictional engagement of the second brake drum 51 with the second brake shoe 53. In this position the driven shaft 24 is not only locked against rotation but also the transmission of driving force from the drive shaft 35 to the driven shaft 24 is terminated.

Having thus described a preferred embodiment of the invention with the view of concisely illustrating the same, we claim:

In combination with a tractor, a detachable speed-reduction power take-off mechanism comprising a compartmented housing mounted on said tractor, said housing having a brake containing chamber axially spaced with respect to a gear unit containing compartment, a drive shaft having an inner end extending axially into said compartment from an end thereof opposite from said chamber journaled for rotation in said compartment, the outer end of said drive shaft rotatably connected to a source of power on said tractor and the inner end constrained for rotation in said compartment, a driven shaft constrained for rotation in coaxial alinement with said drive shaft and extending through said chamber, a driving end of said driven shaft projecting outside of said housing and a driven end extending into said compartment, a planetary gearing unit carried by said housing in said compartment, said gearing unit comprising a driving element drivingly connected for rotation with the inner end of said drive shaft and a driven element drivingly connected for rotation with the driven end of said driven shaft, said driving element comprising a first sun gear constrained for coaxial rotation with said drive shaft, a second sun gear constrained for coaxial rotation with said driven shaft, a force-reaction member constrained for coaxial rotation about the axis of said driving element and driven element, a plurality of pinion shafts disposed equilaterally in said force-reaction member, said pinion shafts each being mounted parallel to said driving element and driven element, a gear element mounted for axial rotation on each of said pinion shafts, each said gear element comprising a first pinion gear and a second pinion gear integrally connected with each other and constrained for rotation about its respective pinion shaft, each said first pinion gear being meshed with said first sun gear and each said second pinion gear being meshed with said second sun gear, a tubular shaft disposed concentrically for rotation about said driven shaft, said tubular shaft projecting into said compartment and said chamber, one end of said tubular shaft being constrained for rotation with said force-reaction member, said force-reaction member being brakable to engage said gearing unit to cause transmission of driving force from the driving element to the driven element, said force-reaction member being inoperable to transmit driving force from the driving element to the driven element when the force-reaction member is unconstrained against rotation, a first releasably engageable brake means comprising a first annular friction element mounted in said chamber and constrained for rotation with the other end of said tubular shaft for preventing rotation thereof when said first brake means is engaged, a second releasably engageable brake means comprising a second annular friction element mounted in said chamber adjacent to said first friction element and constrained for rotation with said driven shaft for preventing rotation thereof when said second brake means is engaged, and means for alternately engaging one of said brake means while disengaging the other brake means.

References Cited in the file of this patent

UNITED STATES PATENTS

| | | |
|---|---|---|
| 1,181,861 | Dudley | May 2, 1912 |
| 1,706,109 | Dodge | Mar. 19, 1929 |
| 2,330,198 | Banker | Sept. 28, 1943 |
| 2,666,492 | Nims et al. | Jan. 19, 1954 |